July 4, 1950     R. L. MEALEY     2,513,345
TOOL SETTING GAUGE
Filed Nov. 19, 1946
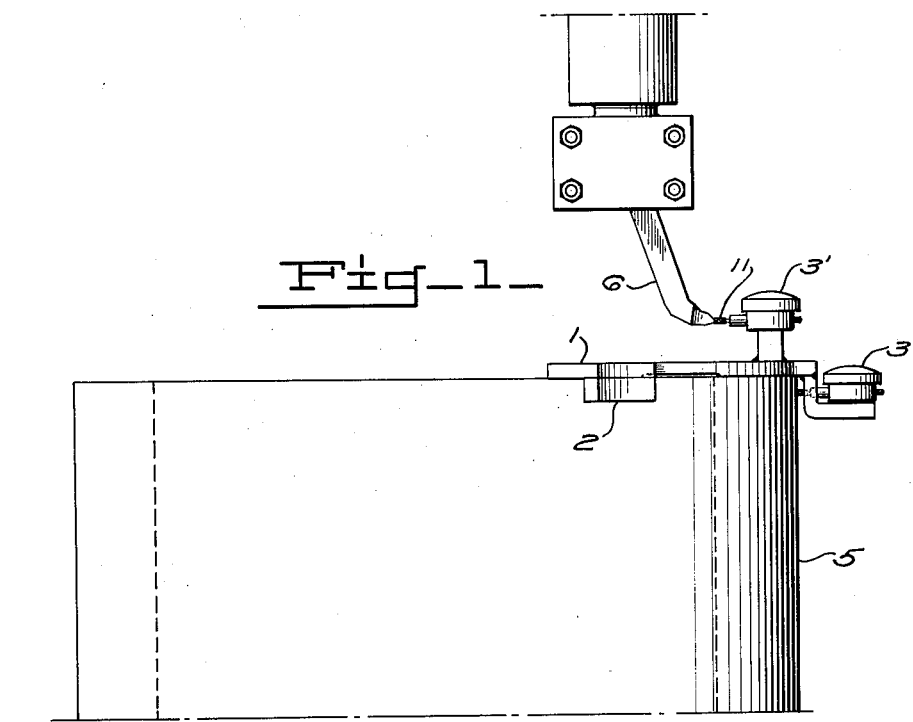
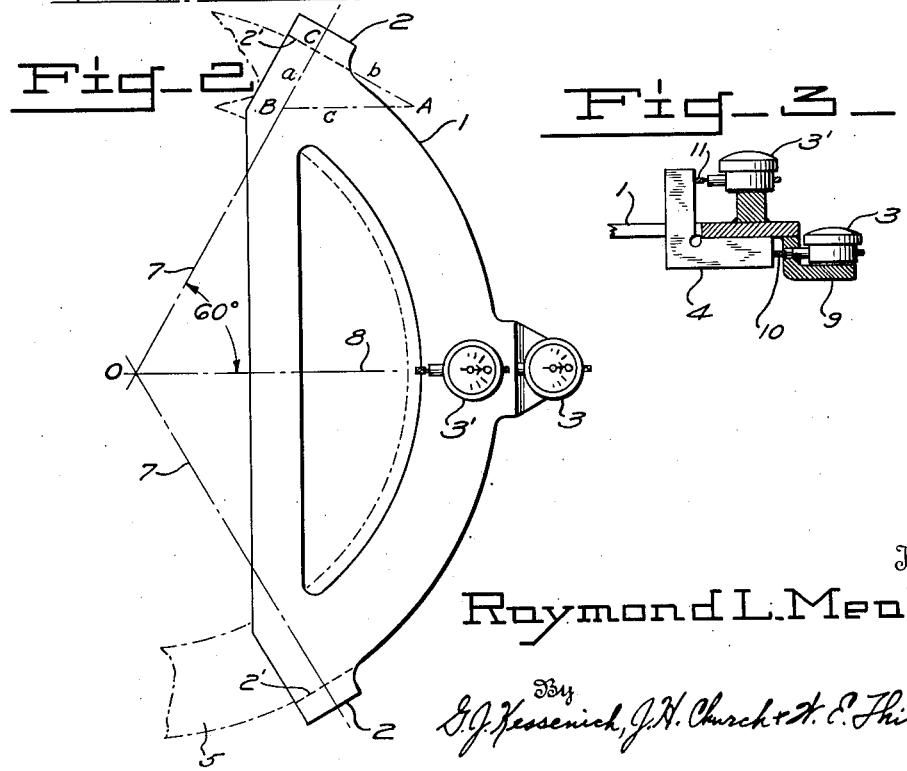
Inventor
Raymond L. Mealey
By G. J. Kessenich, J. H. Church & H. E. Thibodeau
Attorneys Patented July 4, 1950

2,513,345

UNITED STATES PATENT OFFICE 2,513,345

TOOL SETTING GAUGE

Raymond L. Mealey, Watervliet, N. Y.

Application November 19, 1946, Serial No. 710,920

2 Claims. (Cl. 33—185)

(Granted under the act of March 3, 1883, as amended April 30, 1928; 370 O. G. 757)

The invention described herein may be manufactured and used by or for the Government for governmental purposes without the payment of any royalty thereon.

This invention relates to a gage, more particularly to a gage for setting a boring tool to the proper cutting dimension.

When machining large bores such as the bores of breech rings of large caliber firearms it is time consuming and inconvenient to arrive at the final bore dimension by conventional measuring methods. The usual way of producing such a bore is first to drill a hole in the center of the workpiece and then gradually increase such hole by means of a boring tool. As the bore gradually approaches the finished bore more frequent measurements of the diameter must be taken and with consequent adjustments of the boring tool. Such measurements are normally made by inside calipers or inside micrometers which results in a necessarily slow and somewhat laborious procedure.

Accordingly it is an object of this invention to provide a gage whereby the boring tool can be accurately and quickly set for the final boring operation.

The specific nature of the invention as well as other objects and advantages thereof will clearly appear from a description of a preferred embodiment as shown in the accompanying drawings in which:

Fig. 1 is a side elevational view of a cylindrical workpiece showing the gage mounted thereon with the boring tool contacting such gage for setting of the boring tool.

Fig. 2 is a top elevational view of the gage.

Fig. 3 is a detail view showing the method of setting the two dial indicators to the proper differential by means of a size block.

The tool setting gage to be described herein is preferably utilized to accurately set the cutting tool of a boring machine to a certain dimension so that the finished bore can be produced with one final setting of the boring tool without the necessity of measuring the bore. In the preferred application this invention is utilized for setting a boring tool to the proper dimension for the finishing cut when boring the breech ring of large caliber guns. It is customary in fabricating these breech rings to first turn the outside diameter to a certain dimension before the boring operation but it should be understood, however, that this dimension can and does vary slightly.

There is shown in assembled relation in Fig. 2 a tool setting gage comprising a substantially segmental shaped body portion 1 and a pair of dial indicators 3 and 3'. Body 1 is preferably formed from flat stock and is provided with a pad 2 on each end thereof and which are secured to the underside of such body, preferably by welding. Each pad is disposed at right angles to a radial line 7 and each radial line 7 is disposed at an angle of 60 degrees from a centerline 8 of body 1. Accurately ground bearing surfaces 2' are provided on the inside of each pad 2 and such surfaces are spaced the same distance from the center 0 of the arcuate periphery of body 1. Thus bearing surfaces 2' are disposed at an angle of 30 degrees from centerline 8.

Dial indicator 3' is centrally disposed on the face of body 1 as shown in Fig. 3 and indicator 3 is mounted on a bracket 9 which is secured to the underside of body 1 preferably by welding. Each dial indicator 3 and 3' is provided with a spring biased contact plunger, 10 and 11 respectively. Dial indicators 3 and 3' are so aligned that plungers 10 and 11 will lie along line 8. Indicating dials 3 and 3' are spaced apart to provide a certain wall thickness when the outside diameter of breech ring 5 has been turned to a certain prescribed dimension.

Plunger 10 of dial 3 is adjusted to a "zero" position by a master ring gage. Contact plunger 11 of dial indicator 3' is then carefully adjusted or zeroed by means of a gage block 4 to obtain the proper spacing between the two plungers 10 and 11. If there was no variation in the diameter of the workpiece there would be no necessity for having adjusting dial indicators 3 and 3' as will be later seen.

Prior to boring a breech ring 5 as shown schematically in Fig. 1 the breech ring is set on the boring machine so that the center thereof lies directly under the axis of the spindle of the boring machine (not shown). The gage is then placed on top of breech ring 5 as shown in Fig. 1 with bearing surfaces 2' contacting the periphery of breech ring 5. With the gage so placed dial indicator 3 will register zero when the diameter of ring 5 is equal to that of the master ring gage. Therefore, if the reading on the outer dial indicator 3 registers zero the boring tool 6 of the boring machine (not shown) is brought to bear against the end of contact plunger 11 of indicator 3' and adjusted until indicator 3' indicates zero. Boring may now proceed and such bore will be formed to the prescribed dimension.

If however, the outside diameter of breech ring 5 is greater or less than the prescribed diameter, the indicating needle on indicator 3 will not register zero but will register the discrepancy or error in a plus or minus direction. If such is the case the boring tool is moved radially in the proper direction until indicator 3' registers double the amount of error shown in indicator 3.

Indicator 3' must show twice the amount of discrepancy or error indicated on indicator 3 for the reason that bearing surface 2 is disposed at an angle of 30 degrees to the centerline 8 on which indicators 3 and 3' are located. Therefore any change in length of the radius permits the body of the gage to move inwardly along centerline 8 an amount equal to twice the change in length of the radius of the breech ring 5. This relationship is readily shown by reference to Fig. 2 wherein there is shown in dotted outline a small 30°-60°-90° triangle ABC. If the error or discrepancy in the radius of breech ring 5 is denoted as "$a$," movement of the gage body 1 along the central radial line 8 will be twice "$a$." This is readily shown by the following trigonometric relationship. Sine A is equal to $$\frac{a}{c}$$

therefore as angle A is equal to 30°, sine $$A = \frac{1}{2}$$

then by transposing, $c$ equals $2a$, therefore indicator 3' will have to move twice the amount shown on indicator 3 to obtain the correct setting of the boring tool.

From the foregoing description it is thus readily apparent that there is here provided a gage for accurately and conveniently setting the boring tool of a boring machine to the correct dimension for taking the finishing cut of the interior bore of a workpiece without the necessity of cumbersome conventional measuring methods of somewhat doubtful accuracy. It is further apparent that this gage may be readily used to set the boring tool at a prescribed measurement on any cylindrical workpiece having the outside diameter turned to a prescribed dimension.

I claim:

1. A gage for setting a boring tool for boring the interior of a cylindrical workpiece comprising a segmental body portion, a pad on each end of said body portion, each of said pads having a bearing surface thereon disposed at right angles to a radial line projected from the center of said body portion and adapted to engage the cylindrical surface of the workpiece, a first indicator provided with an adjustable gaging spindle, said first indicator mounted on said body portion with said spindle parallel to a centerline equidistant between the radial lines of said pads and arranged to contact the outer surface of the workpiece, and a second indicator mounted on said body portion above and parallel with said first indicator and so spaced therefrom that the boring tool may be directly set to produce the desired wall thickness of the workpiece, said second indicator being also provided to permit adjustment of the boring tool for diametral changes of the various workpieces.

2. A gage for setting a boring tool for boring the interior of a cylindrical workpiece comprising a segmental body portion, a pad on each end of said body portion, each of said pads having a bearing surface thereon disposed at right angles to a radial line projected 60° from the horizontal centerline of said body portion and adapted to engage the outer surface of the workpiece, a first indicator provided with a gaging spindle mounted on the centerline of said body portion and arranged to contact the outer surface of the workpiece, and a second indicator provided with a gaging spindle mounted on said body portion above and parallel with said first indicator, said second indicator adapted to register twice the amount shown on said first indicator as the position of said body portion on the workpiece changes due to diametral changes in the various workpieces whereby a correct setting of the boring tool may be attained by said second indicator.

RAYMOND L. MEALEY.

REFERENCES CITED

The following references are of record in the file of this patent:

UNITED STATES PATENTS

| Number | Name | Date |
| --- | --- | --- |
| 1,195,330 | Binney | Aug. 22, 1916 |
| 2,000,476 | Schmidt | May 7, 1935 |
| 2,043,613 | Hane | June 9, 1936 |

FOREIGN PATENTS

| Number | Country | Date |
| --- | --- | --- |
| 6,566 | Great Britain | Mar. 17, 1913 |